Nov. 17, 1970  G. LANGE  3,541,499
ACOUSTIC SPEEDMETER (LOG)
Filed Feb. 27, 1968
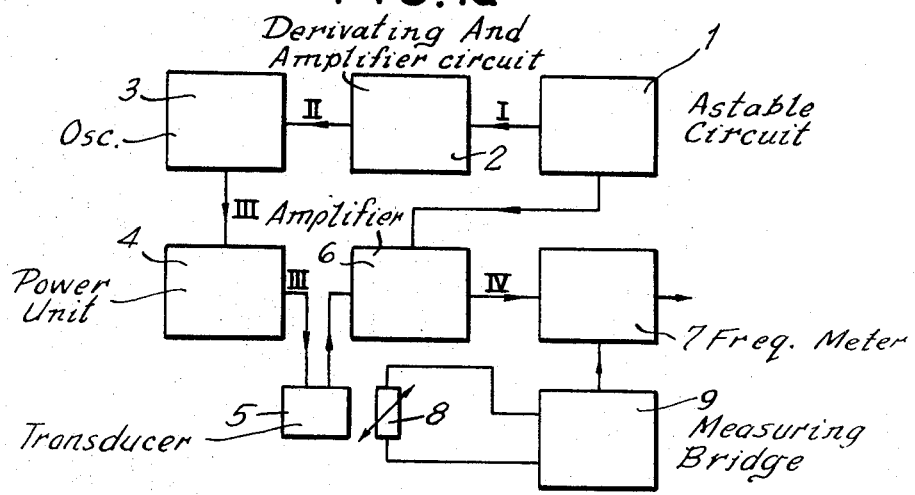
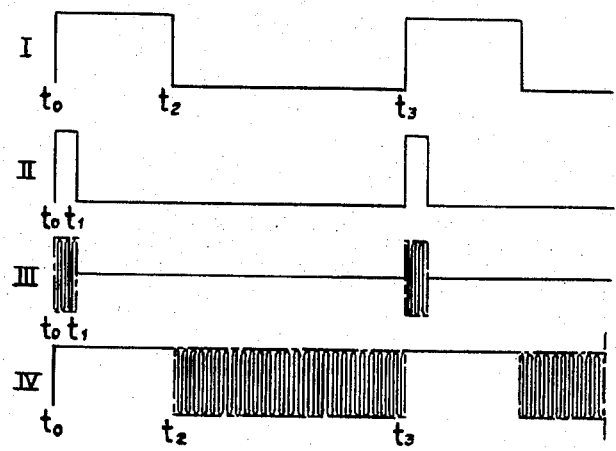
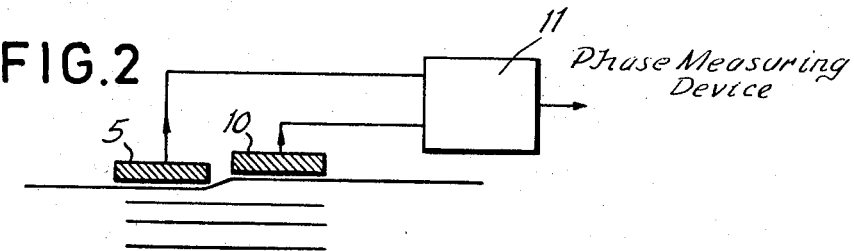
INVENTOR.
GÖSTA LANGE
BY
Brumbaugh, Free, Graves & Donohue
his ATTORNEYS.

United States Patent Office

3,541,499
Patented Nov. 17, 1970

3,541,499
ACOUSTIC SPEEDMETER (LOG)
Gösta Lange, 15 Ovanskogsliden,
Goteborg, Sweden
Filed Feb. 27, 1968, Ser. No. 708,635
Claims priority, application Sweden, Mar. 1, 1967,
2,779/67
Int. Cl. G01s 9/66
U.S. Cl. 340—3                                      6 Claims

ABSTRACT OF THE DISCLOSURE

When measuring the velocity of a craft relative to the sea, by means of a submerged supersonic signal transmitter and a receiver arrangement for continuous operation, utilizing the Doppler effect at echoes reflected from inhomogeneities naturally present in the water, the measuring result is made erroneous by water movements caused by the moving craft. For eliminating this disadvantage, according to the invention the transmitter is operated intermittently, and the receiver is blocked during a short interval after every transmitting period, whereby echoes from inhomogeneities nearby are eliminated and, thus, the erroneous indication is avoided. The invention also can be applied to air crafts.

---

There are a great number of known hydroacoustic speedmeter constructions, operating after the Doppler-principle and comprising a sound transmitting and an echo receiving electroacoustic transducer. One log type utilizes the sea-bottom as a reflector, another log type makes use of the inhomogeneities in the water, such as micro-organisms, small temperature gradients etc. The latter type, of course, operates independently of the distance to the bottom and gives the speed through water, not the speed over ground. Hereinafter only the type utilizing inhomogeneities in the surrounding medium (water) will be dealt with, which in its known construction applies continuous transmission. When the log is moving through the water, the echoes received are given a frequency, owing to the Doppler-effect, which is different from the frequency transmitted. The echo signals received can be mixed with the signal transmitted, the difference frequency being a measure of the log speed through the water. By this principle, however, the echoes from the nearest surroundings of the log will dominate, because their intensity is many times greater than the echoes from points located farther away. However, the field around a moving ship's hull is disturbed, i.e. the great mass of the ship affects the nearest surroundings and imparts a speed also thereto. The hull "pushes the water ahead" or it takes the water along. Due to the movement of the field near the hull, the echoes therefrom, thus, indicate a speed lower than that which theoretically is correct.

The disturbed field around a great merchantman can have an extension of several tens of meters. The present invention refers to a method of receiving echoes only from points outside the disturbed field, whereby the echos have the theoretically correct frequency, and the log can be calibrated independently of the type of vessel and even be delivered calibrated without requiring the vessel to make special runs for this purpose.

It is a common method, for example with acoustic proximity fuses, to receive echoes from the nearest range, while echoes from more remote objects are excluded. This is accomplished by holding the receiver (defined as the log portion intermediate the point of signal input from the transducer and the point of the frequency responsive output) in an operative state only for a short period after a sound pulse was transmitted. Echoes from a greater distance arrive later and find the receiver closed. In the present invention the principle is converted to opposite effect, i.e. the receiver is held cut off or "closed" immediately after the sound pulse was transmitted, and only after a period corresponding to the travel time for echoes from undisturbed water the receiver is activated or "opened" for a while. The receiver may be closed, for example, for about 20 milliseconds after the transmission of the sound pulse, and thereafter be open from 20 to 60 milliseconds after said transmission, whereafter the procedure is repeated. Hereby echoes are received arriving from points located at a distance between 15 and 45 m. from the transmitting element.

The invention is described in greater detail in the following, with reference to the accompanying drawing. FIG. 1a shows a block diagram of electronic sub-units and an electro-acoustic transducer, which together form a log operating after the above-described principle and being capable of delivering an electric output signal depending on the log speed. FIG. 1b shows the appearance of the electric signals at different points according to FIG. 1a.

FIG. 2 shows a device adapted for measuring the sound speed in the medium surrounding the log. The device utilizes two electro-acoustic transducers, whereof one preferably may be the same as in the log according to FIG. 1a and giving an output signal which can be used for rendering the output signal of the log independent of variations in the sound speed of the surrounding medium.

In FIG. 1a, 1 designates a conventional astable multivibrator having an output signal of the shape according to I in FIG. 1b. 2 is a derivating and amplifying unit operating on the rising part of the wave form I, so that a pulse having the length $t_0-t_1$ is obtained according to the wave form II in FIG. 1b. If desired, 2 may be a blocking oscillator, or a monostable multivibrator etc. The short pulse II is supplied to an oscillator 3 which oscillates whilst the pulse is being applied and, consequently, has the wave form III in FIG. 1b. In a subsequent power unit 4 the oscillator output signal is amplified to the desired level and applied to the electro-acoustic transducer 5 which emits sound waves having the wave form according to III. The echoes from the inhomogeneities of the medium now start to arrive, with a travel path proportional to the time after the transmission of the sound waves according to III.

The electro-acoustic transducer 5 is reversible and, thus, the sound pressure from the echoes effects an output voltage therefrom, which voltage is fed to an amplifier 6. This amplifier, however, is controlled by the astable multivibrator 1, in such a manner that it amplifies only during the period $t_2-t_3$ but is blocked during the period $t_0-t_2$, $t_2$ being so chosen that it safely exceeds the travel time for the echoes from points within the disturbed field, and preferably also is so sufficiently advanced, that the electric and mechanical oscillations produced at the emittance are sufficiently attenuated for not directly affecting the receiver. The output voltage from the amplifier 6 has, in principle, an appearance according to the wave form IV in FIG. 1b. This voltage finally is applied on a frequency meter 7, which latter must be designed by taking into consideration that the band width of the echoes is approximately the same as that of the transmitted pulse according to III. The deflection of the frequency meter can be calibrated as to speed, corrections being possible to be made according to the description as follows.

For calculating the craft speed $v$ from the difference frequency $\Delta f$, preferably the following formula is used $$v = c = \frac{2\Delta f}{f_0}$$

where $c$ = the sound speed in the medium and $f_0$ the transmitted frequency. It is apparent that the two last-mentioned magnitudes can affect the result of the measurement. With the present state of art it is not difficult to maintain $f_0$ constant. However, variations in the sound speed can affect the measurement results to a considerable degree. As variations in the sound speed are mainly caused by corresponding variations of the temperature, this problem can largely be overcome by utilizing a temperature sensitive element, for example a thermistor. This thermistor, designated 8 in FIG. 1, is placed close to the sound transducing element 5 and thereby assumes substantially the temperature of the surrounding medium. In a measuring bridge 9, in which the thermistor 8 is comprised, a voltage is produced which is proportional to the thermistor resistance and, thus, is a function of the temperature. This voltage can be superposed upon the direct voltage which feeds the frequency measuring part 7 of the log. The remaining components in the bridge 9 being correctly adjusted, such errors in the speed indication which are due to temperature variations in the surrounding medium, can be completely compensated for.

However, the sound speed in the medium changes not only with the temperature, but also with the salinity and the pressure. Instead of compensating for temperature variations, which is the easiest way from a technical point of view, one may compensate for variations in the sound speed, which is more correct. For being able to measure the sound speed, one must have a known distance and either measure the time required for the sound to travel this distance, or one may measure simultaneously the sound pressure at both end points of the distance and determine the difference in phase position. The practical performance being different, there is, however, basically no difference between these two measuring methods, except that the first method is more adapted for greater distances and the latter method for distances comparable to the wave length.

In FIG. 2 a practical arrangement for measuring the sound speed in the medium is shown, where use is made of an auxiliary transducer 10 located close to the aforementioned electro-acoustic transducer 5. The two transducers are in parallel, but with their end surfaces staggered in the main direction of the sound waves whereby the echoes arriving from long distances meet the two transducers with a certain difference in time between the front and the rear transducer. This gives rise to a phase difference between the output voltage of the transducers, owing to the wave length and the size of the aforesaid mutual staggering. As the latter by virtue of the transducer mounting is constant, and also the frequency of the echoes can be regarded as constant, the phase difference will depend on the sound speed in the surrounding medium. The output voltages from the transducers 5 and 10, therefore, are supplied, possibly after amplification, to a phase measuring device 11. The output voltage from said device is used for compensating for such errors in speed indication which are caused by sound speed variations in the surrounding medium, in the same way as indicated above for the temperature compensation. It makes no difference, as easily can be understood, which of the transducers is placed in front of the other, nor is the size of the staggering in any way critical, as long as it is not close to an even number of wave lengths, because with the small phase variations which may be caused by the variation of $c$, this interdependence can always be regarded as linear, whereafter one may amplify the output voltage from the phase comparator to a suitable degree for achieving the desired compensation. The additional transducer 10 may have the same dimensions as transducer 5 or it may have different dimensions, and it also may be divided into several small transducers, if this appears advantageous from space considerations or for other reasons.

What is set forth above with respect to ships, applies as well to crafts in other mediae, for example to air crafts.

What I claim is:

1. A log for measuring the speed of a craft moving through water, comprising a transmitter for producing acoustic wave signals, a receiver for receiving acoustic wave signals reflected from inhomogeneities inherently present in the water surrounding the craft, the transmitter and the receiver being carried by the craft and being arranged so that the change in frequency of the waves caused by the Doppler effect is taken as a measure of the speed of the craft in relation to the water, means for preventing the reception of acoustic waves reflected from any area of the water about the craft which is disturbed by the craft itself, said preventing means comprising means for restricting the acoustic wave signals from the transmitter to a first period of time, and means for activating the receiver during a subsequent second period of time, the interval between said two periods being longer than the transit time for acoustic wave signals transmitted to an reflected from inhomogeneities in any area of water disturbed by the moving craft whereby false reflections are prevented from being recorded by the receiver and false speed indications are substantially eliminated.

2. A log according to claim 1 wherein the transmitter and receiver comprise an electroacoustic transducer, the restricting means restricts the oscillations from the transmitter to a limited oscillation period, and means operative when the oscillations cease for rendering the receiver inoperative for a period of time at least equal to the travel time of an acoustic wave reflected from a point located in the main direction of the sound waves emitted and on the remote border of the disturbed field surrounding the craft.

3. A log according to claim 2 wherein the period of time the receiver is inoperative is at least as long as the period required for the electrical and mechanical oscillations caused by the transmitter to decay to a negligible value so as to prevent them from directly affecting the receiver.

4. A log according to claim 2, wherein the transmitter and receiver have an electroacoustic transducer in common.

5. A log according to claim 1 including means for measuring the speed of sound in the water including at least one additional receiver located adjacent the normal receiver and having a signal receiving surface parallel to a signal receiving surface of the normal receiver but spaced therefrom, and means for supplying the resulting phase difference between the signals received by the receivers to a circuit emitting an output signal determined by the phase difference between the signals and correcting the speed indication of the log calculated from the Doppler frequency change.

6. A log according to claim 1 wherein the transmitter and the receiver comprise transducers and further comprising a temperature sensitive element placed adjacent one of said transducers to assume the temperature of the transducer and the surrounding water, the temperature sensitive element being connected to a circuit for supplying output signals determined by said temperature for correcting speed indication of the log calculated from the Doppler frequency change.

References Cited

UNITED STATES PATENTS

| | | | |
|---|---|---|---|
| 2,274,262 | 2/1942 | Wolff | 340—5 |
| 2,841,775 | 7/1958 | Saunders | 340—3 |
| 2,908,888 | 10/1959 | Kirkland | 340—3 |
| 3,028,578 | 4/1962 | Stanton | 340—1 |
| 3,139,617 | 6/1964 | Denman et al. | 343—8 |
| 3,333,655 | 8/1967 | Kirby | 340—18 X |

RICHARD A. FARLEY, Primary Examiner